Dec. 8, 1936. J. A. SCHINCK 2,063,403
MATERIAL LOADING MECHANISM
Filed Nov. 22, 1935 3 Sheets-Sheet 1
Fig.1.
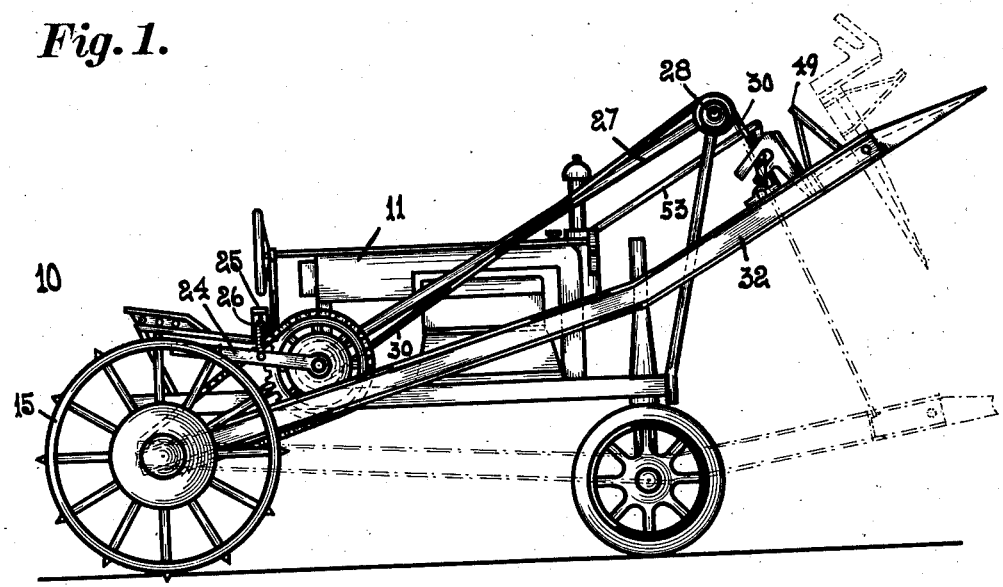
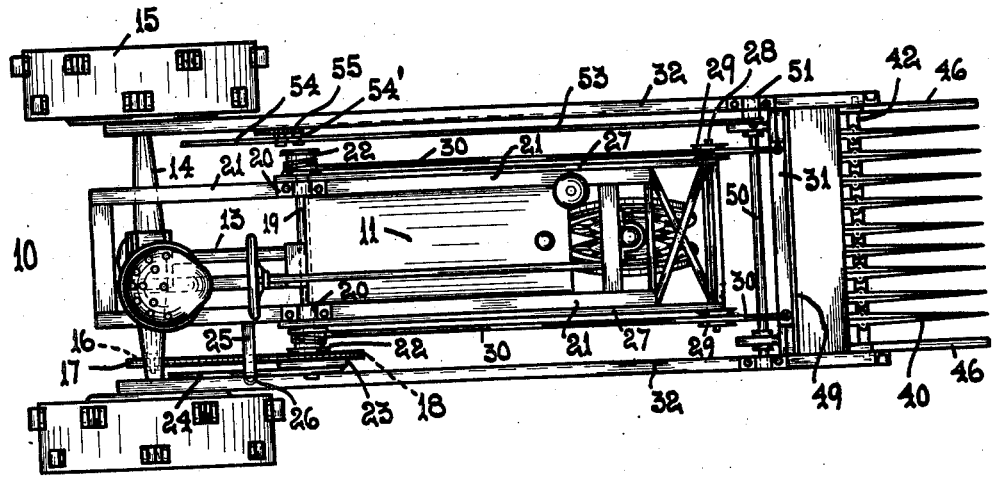
Fig.2.
Inventor
J.A.Schinck
By Arthur H. Sturges
Attorney Dec. 8, 1936.  J. A. SCHINCK  2,063,403
MATERIAL LOADING MECHANISM
Filed Nov. 22, 1935  3 Sheets-Sheet 2

Inventor
J. A. Schinck
By Arthur H Sturges
Attorney

Dec. 8, 1936.  J. A. SCHINCK  2,063,403
MATERIAL LOADING MECHANISM
Filed Nov. 22, 1935  3 Sheets-Sheet 3

Inventor
J. A. Schinck
By Arthur H. Sturges
Attorney

Patented Dec. 8, 1936

2,063,403

UNITED STATES PATENT OFFICE 2,063,403

MATERIAL LOADING MECHANISM

John A. Schinck, Meadow Grove, Nebr.

Application November 22, 1935, Serial No. 51,048

4 Claims. (Cl. 214—140)

The present invention relates to material handling and loading mechanism and has for an object the provision of means for elevating manure, earth, sand, rocks, or the like material to a comparatively high altitude for a convenient dumping thereof onto a vehicle such as a manure spreader or wagon for transportation thereof to a field for fertilizing and the like purposes.

Another object of the invention is to provide a device so constructed that an earth conveying scoop having a closed bottom may be readily interchanged for a scoop provided with open tines for handling manure each said scoop being adapted to handle certain materials.

A further object of the invention is to provide said means and device assembled on and in combination with a self-propelled vehicle for transporting the invention as may be required, whereby the propelling power and mechanism of said vehicle may be conveniently and economically utilized to operate the invention.

A primary object of the invention is to provide adjustable positioning and control means for the scoop so arranged that when said means are released a load of manure, earth or material, carried by said scoop automatically is dumped therefrom and when said scoop is freed from said load, said scoop automatically returns to a normal position with respect to said control means and is re-engaged with the latter.

With the foregoing and other objects in view the invention will be more fully described hereinafter and more particularly pointed out in the claims appended hereto.

In the drawings wherein like symbols refer to like or corresponding parts throughout the several views, Figure 1 is a side elevation of a mechanism embodying the present invention, and Figure 2 is a top plan view thereof.

Figure 3:
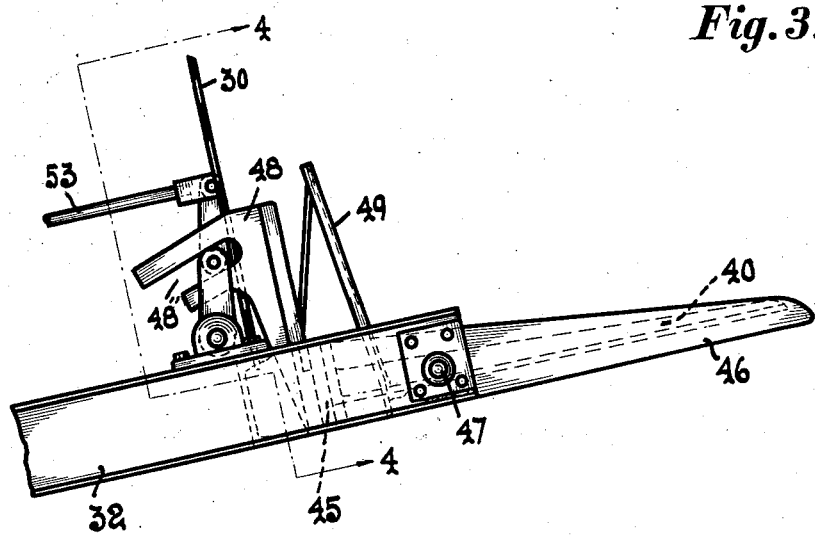
Figure 3 is an enlarged detail showing in side elevation the manure fork or scoop of the present invention and the adjustable control means for the same.

Referring now to the drawings for a more particular description, at 10 is generally indicated a self-propelled vehicle such as a tractor provided with motive power by means of an engine 11, the latter having motion transmission mechanism including a shaft 13 for driving a differential gear at the rear of the vehicle, said gear in turn communicating motion to axles contained within the transversely disposed housing 14. The ends of said axles are provided with pinions adapted to drive larger pinions which are disposed in alignment with respect to the axis of the traction wheels 15 of the vehicle.

Motion for operating certain parts of the present invention is communicated from said gear of the tractor or "power take off", the latter being conventional to tractors; said motion is communicated to a sprocket wheel indicated at 16 for driving the sprocket chain 17 and communicating rotary motion to a larger sprocket wheel 18 keyed to a transversely disposed shaft 19, the latter being journalled in pillow blocks 20. The pillow blocks are bolted to the side rails 21 of the vehicle. Cable spools 22 are provided on the shaft 19 outwardly of said side rails.

A brake drum mechanism of any suitable type is contained within the brake drum housing 23. The brake drum is operable by means of a hand-lever 24 which extends rearwardly to a position adjacent the driver's seat where it may be readily grasped. An arm 25 is secured to a side rail of the vehicle for supporting a spring 26, said spring being positioned between said arm and said lever for holding the lever in a normal position or normally maintaining said brake drum released and it will be understood that when the lever 24 is pushed downwardly the same operates the brake drum within the housing 23 whereby the sprocket wheel 18 is locked to the shaft 19 for rotating the cable spools 22 and that upon a release of the lever 24 rotary movement is not communicated to said cable spools.

As thus described it will be understood that motion and power is communicated from the engine 11 for rotating the spools 22 at times when the clutch of the tractor is in mesh for purposes later described.

At the forward portion of the vehicle or tractor and provided at each side thereof are inverted V-shaped legs 27, their lower ends being secured to suitable parts of the vehicle for supporting a transversely disposed idler shaft 28 having idler pulleys 29 disposed at the outer ends of said shaft, said pulleys being of a grooved type for guiding cables 30 which extend over said pulleys from the winding spools 22. The cables are secured to a cross bar 31 carried by a frame which includes the arms 32, the latter being pivotally mounted at their rear ends about the axle housing 14 adjacent the rear wheels of the vehicle. At times when the cables 30 are wound upon the spools 22 the frame or arms 32 together with the cross bar 31 are raised upwardly thereby.

Figure 8:
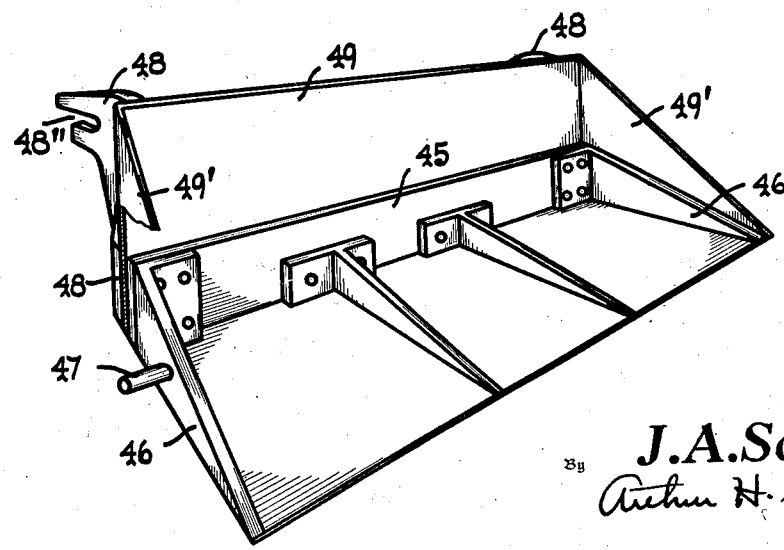
Figure 8 is a perspective view of an earth scoop which may be employed interchangeably with said fork scoop.

Positioned between or at the forward outer ends of the arms 32 or upon said frame a manure scoop mechanism may be attached to said arms, or the manure scoop or fork may be interchanged with the earth handling scoop shown in Figure 8.

Figure 6:
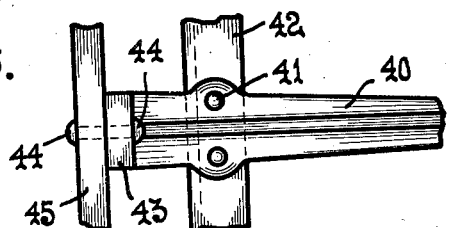
Figure 6 is a top plan view of the tine shown in Figure 5, the view being taken between the dotted lines 6—6 thereof.

Means are provided for tilting either scoop with respect to the said frame or arms 32 for dumping a load of material therefrom and for adjusting a scoop to a selected material digging or gathering position with respect to said frame. The tines 40 of the manure fork scoop, as best shown in Figure 6, are secured by means of rivets 41 to a transversely disposed bar 42 which functions to hold said tines in parallelism with respect to each other. The rear ends of said tines are provided with upturned portions 43 disposed at a right angle with respect to the main body portion of said tines, and secured by means of rivets 44 to a transversely disposed plate 45, the tines 46 disposed at each side of the tines 40 or at each end of the row of tines 40 are preferably of a slightly different shape than said tines 40, as best shown in Figures 2 and 8. The end tines 46 are each provided with an outwardly extending stub axle 47, Figures 3 and 4, said axles are journalled through the arms 32 of the frame disposing the fork or scoop between said arms. Blocks 48' provide a bearing for the stub axles 47, said blocks being riveted to the arms 32, as best shown in Figure 4.

The means for tilting a scoop with respect to the arms 32 of the frame preferably includes a pair of oppositely disposed cam hooks 48 which are riveted, as shown in Figure 8, to the plate 45. As best shown in Figures 2 and 8, a sheet iron member 49 is provided between the plate 45 and the cam hooks 48. The earth scoop, shown in Figure 8, is provided with a back wall by means of the member 49, said scoop having side walls 49', and, as shown in Figure 2, the sheet iron member 49 provides a back wall for the manure scoop. Said member 49 is omitted from Figure 7 for the purpose of clarifying the dotted lines of said figure.

Figure 4:
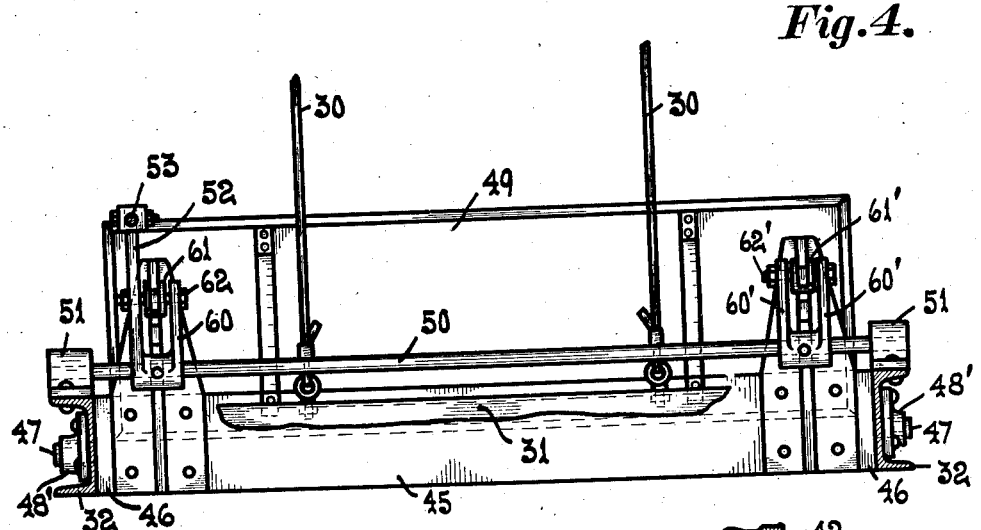
Figure 4 is a transverse vertical section taken on line 4—4 of Figure 3.
Figure 5:
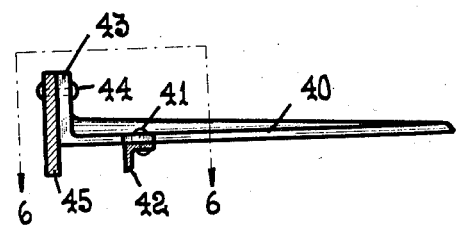
Figure 5 is a side elevation of a tine of the fork scoop employed.

As best shown in Figure 4, a transversely disposed shaft 50 is carried in pillow blocks 51, the latter being secured to the oppositely disposed arms 32 heretofore described. A lever-arm 52 is keyed or rigidly secured to the shaft 50. The lever-arm 52 is pivotally connected to a reach rod 53, the latter extending to the rear of the vehicle where it may be readily actuated by the operator by means of a hand-lever 54, as best shown in Figure 2, and is provided with a pivotal connection to the member 53 as at 54'. The lever 54 is provided with a sector detent 55 for holding it selectively at different positions and it will be understood that when the lever 54 is moved the motion is communicated to the lever-arm 52 through the rod 53 for communicating a corresponding movement to the cam hooks 48, the latter, in turn, affecting the position of the manure fork or scoop for changing the angle of inclination thereof during loading earth or manure and also said hand-lever 54 is actuated by the operator for dumping loads from the scoop or from the fork as later described.

The lever-arm 52 is bifurcated, as best shown in Figure 4, having a portion 60 of lesser length than the lever-arm 52. Between said portion 60 and lever-arm 52 a pin 62 is positioned having a roller detent 61 mounted thereon. Oppositely disposed with respect to the lever-arm 52 and keyed to or rigidly secured to the shaft 50 is a bifurcated arm 60' having a pin 62' and a detent roller 61'.

The rollers 61 and 61' are, at times, received within the slots 48'' of the cam hooks 48, the arrangement being such that when the hand-lever 54 is actuated by the operator motion is communicated forwardly of the vehicle for adjusting the inclination of the tines 40 or bottom of a scoop with respect to the arms 32 or frame and for permitting dumping of a load from a scoop by the weight of said load with respect to the position of said load on the scoop.

In operation the hand lever 24 is actuated by the operator for releasing the brake drum and the cable spools 22 for permitting a lowering, by gravity, of the forward free end of the frame adjacent to the surface of the earth, the hand-lever 54 being operated simultaneously for causing the manure fork to be in substantial parallelism with said surface, if desired. In instances where the earth scoop is employed the lever 54 may be actuated for tilting the forward cutting edge of the scoop downwardly whereby it will engage under the surface of the earth for scooping, digging, gathering, and removing a portion thereof. Also a scoop may be inclined with respect to said frame for gathering manure from the top of a pile thereof. At this time, or after the scoop has been adjusted to a selected degree of inclination for a particular purpose, the vehicle or tractor is caused to move forwardly in a well known manner for gathering a load of earth or manure upon the scoop, after which the arms 32 or frame together with said load are raised upwardly to a desired elevation by operation of the winding spools whereby the load may be dumped upon or in a manure spreader or truck then temporarily positioned under said load.

Figure 7:
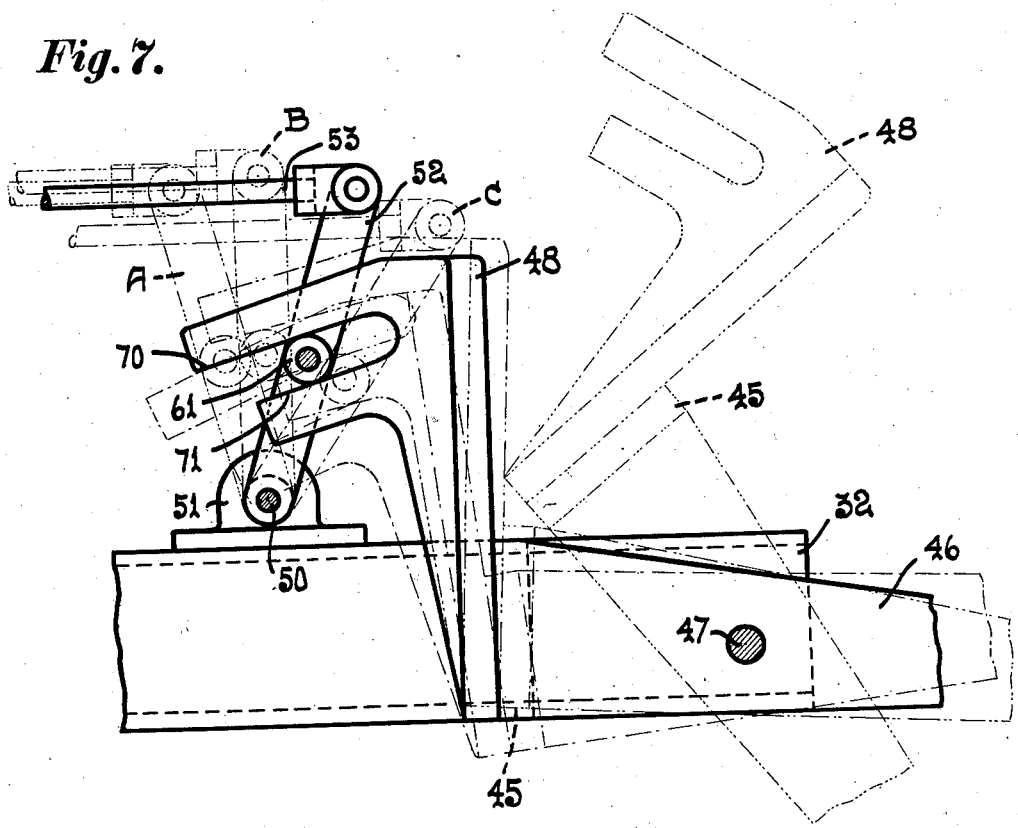
Figure 7 is an enlarged detail of the said control means and fork scoop and showing, in dotted lines, said parts in various positions of adjustment.

To dump a load from a scoop and referring to Figure 7 the rod 53 and lever-arm 54 are caused to move rearwardly to the dotted line position A thereof; whereupon the roller 61 of the lever 52 becomes freed from the walls 71 of the slot of the hook 48, the scoop, resultant from the weight of the load being primarily forward of the pivots or stub axles 47, then describing a dumping movement the forward end of the scoop tilting or swinging downwardly in a vertical direction until the load slides off from the scoop. When freed from the weight of said load the mass or weight of the heavy cam hook 48, placed at the end of and carried on the scoop, then overcomes the comparatively lesser weight of the then empty and oppositely disposed end of the scoop, which causes the scoop to automatically return to its initial position with respect to the frame after said dumping movement, the hook releasably reengaging with the roller detent 61 of the lever-arm 52 of the inclination adjusting means for the scoop during said return movement. The said reengagement of the hook with the roller detent is facilitated by means of the longer wall 70 of the cam hook first engaging the roller, during said return movement, the shorter wall 71 of the cam hook, at said time, being out of the way on account of the lesser length thereof with respect to said wall 70.

At this time the lever arm 52 may be moved to the dotted line position B shown in Figure 7, the full line position, or the dotted line position C shown in said figure for tilting the outer edge of the scoop or the outer ends of the tines of the fork for purposes heretofore described.

Preferably two cam hooks and two roller detents are employed as well as two side rails 32 for the elevating frame of the mechanism.

It is obvious that various changes and modifications may be made in the details of construction and design of the above specifically described embodiment of this invention without departing from the spirit thereof, such changes and modifications being restricted only by the scope of the invention as claimed.

What is claimed is:—

1. A material handler, having a frame, a scoop pivoted in the frame, a hook secured to and extending backwardly from the scoop and having a rearwardly opening slot therein extending backwardly relative to the scoop, said slot provided with a relatively long arm at the upper side thereof, a lever pivoted on the frame having a roller engaging in the slot of the hook to hold the scoop in loading position, means for swinging the lever to move the roller in the slot and vary the angle of the scoop in the frame and adapted to be swung to release the roller from the slot and free the scoop for movement into dumping position.

2. A material handler, having a frame, a scoop pivoted in the frame and having a rearwardly extending hook with a rearwardly opening slot therein, said slot provided with a relatively long arm at the upper side thereof, a lever pivoted on the frame in spaced relation to the scoop and having a roller engaging in the slot to hold the scoop in gathering position on the frame, and a handle on the frame connected to the lever for pivoting the same to move the roller in the slot and change the angle of the scoop in the frame and for moving the roller out of the slot to free the scoop for dumping.

3. A material handler, having a frame, a scoop pivoted in the frame, a pair of hooks on the inner end of the scoop having rearwardly opening slots therein with relative long arms at the upper sides of the slots, a transverse shaft journalled in the frame rearwardly of the scoop, levers fixed to the shaft and having rollers engaging in said slots to hold the scoop in gathering position, a handle pivoted on the frame remote to the scoop, and a connecting rod between the handle and the shaft for turning the latter to swing the levers and move the rollers in the slots of the hooks, whereby to adjust the angle of support of the scoop in the frame, said handle adapted for adjustment to swing the rollers out of the slots and free the hooks, whereby the scoop may swing into dumping position.

4. A material handler, having a frame, a scoop pivoted in the frame, a hook secured to and extended backwardly from the scoop with a rearwardly opening slot, said slot provided with a relatively long arm at the upper side thereof, a lever pivoted on the frame having a detent engaged in the slot of the hook to hold the scoop in loading position, means for swinging the lever to move the detent in the slot and vary the angle of the scoop in the frame and adapted to be swung to release the detent from the slot and free the scoop for movement into dumping position.

JOHN A. SCHINCK.